(12) United States Patent
Ramachandran et al.

(10) Patent No.: US 12,475,027 B2
(45) Date of Patent: Nov. 18, 2025

(54) SYSTEMS AND METHODS FOR REGRESSION TESTING USING ARTIFICIAL INTELLIGENCE

(71) Applicant: Salesforce, Inc., San Francisco, CA (US)

(72) Inventors: Govardana Sachithanandam Ramachandran, Palo Alto, CA (US); Yingbo Zhou, Palo Alto, CA (US); Madhuri Gore, San Francisco, CA (US); Susan Putvin, Alamo, CA (US); Hari Krishna Pottabathula, Hyderabad (IN); Ganeswara Rao Dulam, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 109 days.

(21) Appl. No.: 17/937,652

(22) Filed: Oct. 3, 2022

(65) Prior Publication Data
US 2024/0118995 A1   Apr. 11, 2024

(51) Int. Cl.
G06F 9/44        (2018.01)
G06F 11/3668     (2025.01)

(52) U.S. Cl.
CPC ...... *G06F 11/3688* (2013.01); *G06F 11/3684* (2013.01)

(58) Field of Classification Search
CPC .................. G06F 11/3688; G06F 11/3684
See application file for complete search history.

(56) References Cited

U.S. PATENT DOCUMENTS

| | | | |
|---|---|---|---|
| 5,465,321 A * | 11/1995 | Smyth ................ | G06F 11/2257 706/20 |
| 10,949,337 B1 * | 3/2021 | Yalla ..................... | G06N 20/00 |
| 2003/0233600 A1 * | 12/2003 | Hartman ........ | G01R 31/318307 714/32 |
| 2019/0004926 A1 * | 1/2019 | Bangalore Krishnamurthy ......... | G06F 11/3672 |
| 2019/0391798 A1 * | 12/2019 | Farrell ................ | G06F 11/3672 |
| 2020/0057976 A1 * | 2/2020 | Prakash ........... | G06Q 10/06393 |
| 2021/0326228 A1 * | 10/2021 | Metin ................. | G06F 11/3608 |
| 2021/0349811 A1 * | 11/2021 | Quemy ............... | G06F 11/3684 |
| 2022/0300809 A1 * | 9/2022 | Okamoto .............. | G06N 3/084 |
| 2023/0130781 A1 * | 4/2023 | Suneja .................... | G06F 8/75 706/12 |

* cited by examiner

*Primary Examiner* — Thuy Dao
*Assistant Examiner* — Lenin Paulino
(74) *Attorney, Agent, or Firm* — Haynes and Boone, LLP

(57) ABSTRACT

Embodiments described herein provide regression testing using artificial intelligence. A regression testing network model for a first plurality of organizations using a common codebase is provided. The regression testing network model provides an organization finite state machine (FSM) model for each organization. A first dataset including samples of the organization FSM models based on regression testing for one or more previous releases of the common codebase prior to a first release of the common codebase is received. A training dataset is generated based on the first dataset. The regression testing network model using the training dataset. A second plurality of organizations for regression testing for the first release is determined, from the first plurality of organizations, using the trained regression testing network model.

20 Claims, 14 Drawing Sheets

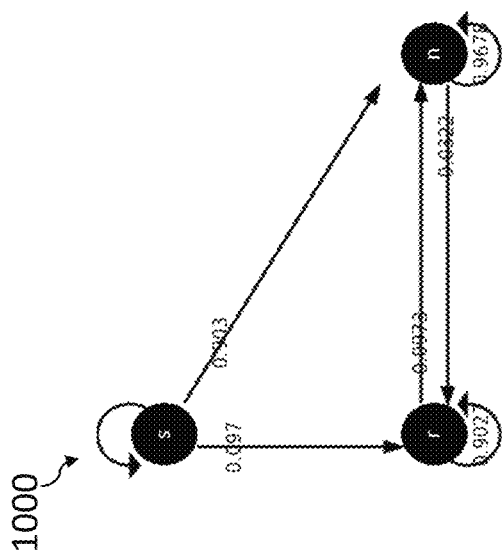
FIG. 9
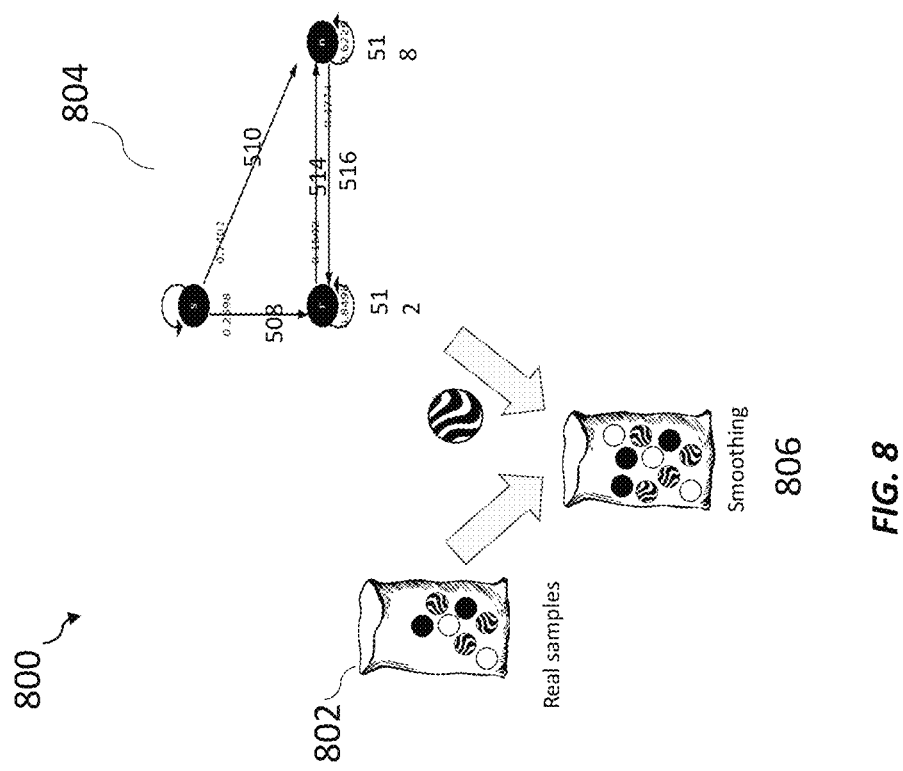
FIG. 10
FIG. 8

| Artifact Types | Pseudo Count | Coverage of Bugs of First Type 1102 | | Coverage of Bugs of Second Type 1104 | | All coverage 1106 | |
|---|---|---|---|---|---|---|---|
| | | 80% | 90% | 80% | 90% | 80% | 90% |
| OrgId | 0 | 14 | 28 | 65 | 88 | 35 | 69 |
| | 10 | 23 | 29 | 43 | 78 | 35 | 53 |
| OrgId_ClassId | 0 | 17 | 33 | 43 | 50 | 37 | 49 |
| | 10 | 20 | 27 | 30 | 64 | 25 | 44 |
| OrgId_ClassId_methodId | 0 | 19 | 37 | 43 | 60 | 37 | 50 |

FIG. 11

| # of releases since observation | State of a test artifact | | |
|---|---|---|---|
| | s | r | n |
| 0 ← 1602 | 1.00 | 0.00 | 0.00 |
| 1 ← 1604 | 0.00 | 0.26 | 0.74 |
| 2 ← 1606 | 0.00 | 0.50 | 0.50 |
| 3 ← 1608 | 0.00 | 0.62 | 0.38 |

SYSTEMS AND METHODS FOR REGRESSION TESTING USING ARTIFICIAL INTELLIGENCE

TECHNICAL FIELD

The embodiments relate generally to artificial intelligence and machine learning systems, and more specifically to using artificial intelligence for regression testing.

BACKGROUND

Regression testing is re-running functional and non-functional tests to ensure that previously developed and tested software still performs after a change. If not, that would be called a regression. As software is updated or changed, or reused on a modified target, emergence of new faults and/or re-emergence of old faults is quite common. For software updates that affect a large number of organizations, running tests of each organization creates a lot of overhead and uses a lot of resources.

Therefore, there is a need for more efficient regression testing.

BRIEF DESCRIPTION OF THE DRAWINGS

FIG. 8 is an example diagram of a smoothing process using pseudo samples, according to some embodiments described herein.

FIGS. 9-13 provide example data performance of the AI based regression testing model, according to some embodiments described herein.

Figure 1:
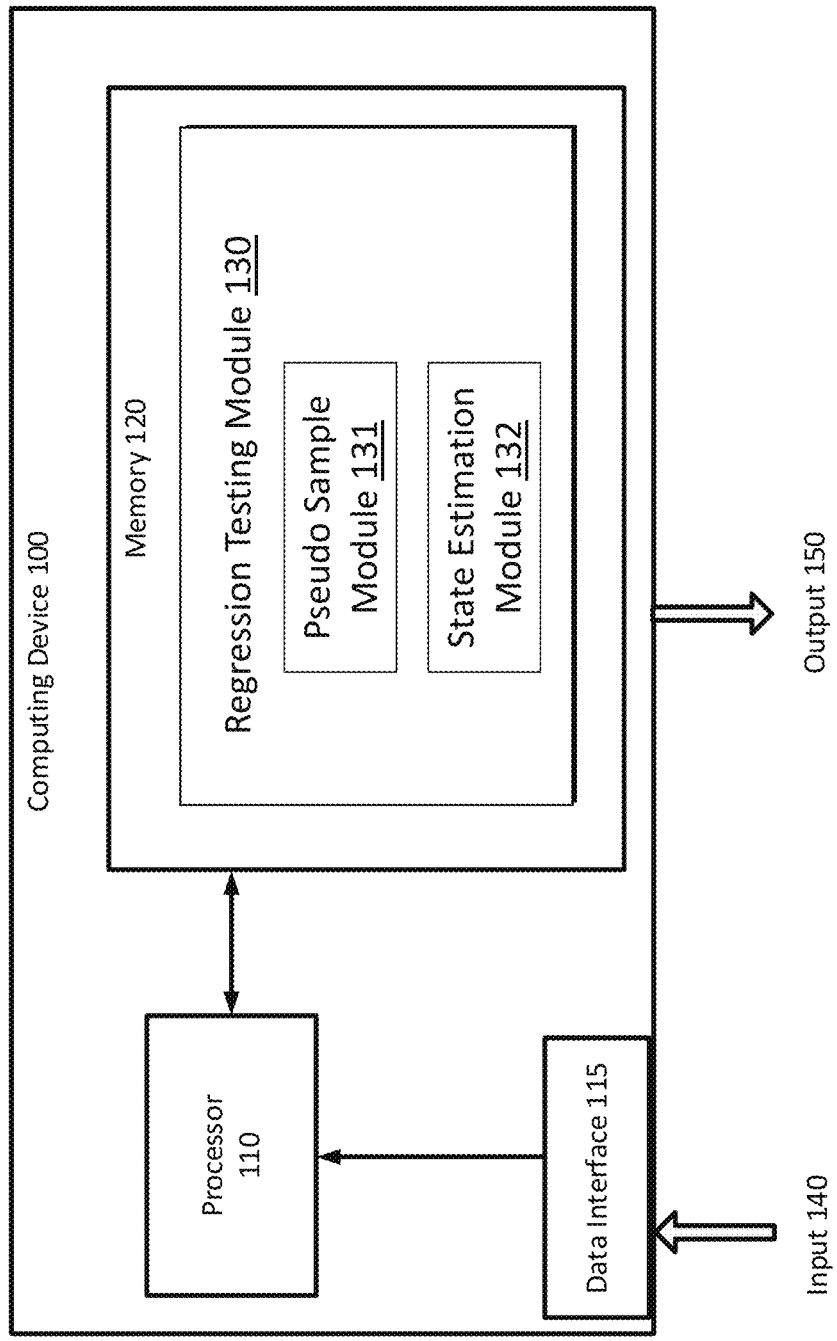
FIG. 1 is a simplified diagram illustrating a computing device implementing the regression testing framework described in FIGS. 3-21 according to some embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Regression testing is re-running functional and non-functional tests to ensure that previously developed and tested software still performs after a change. If not, that would be called a regression. As software is updated or changed, or reused on a modified target, emergence of new faults and/or re-emergence of old faults is quite common. For example, at each major release, a regression testing team may run customer organization test cases for a large number of organizations to catch any regression because of the release. Running tests of each organization creates a lot of overhead and uses resource. Further, teams with assigned regression have a limited time window to fix the regression.

In view of the need for improved regression testing, embodiments described herein provide systems and methods for AI-based regression testing. By using AI and machine learning models for regression testing, cost of running the regression tests is reduced, and lead time for fixing the regression is improved.

Computer and Network Environment

FIG. 1 is a simplified diagram illustrating a computing device implementing the regression testing framework described in FIGS. 3-21, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for regression testing module 130 that may be used to implement and/or emulate the systems and models, and/or to implement any of the methods described further herein. A regression testing module 130 may receive input 140 such as an input training data (e.g., states of organization from regression testing for previous releases) via the data interface 115 and generate an output 150 which may be a portion of organizations for regression testing for the current release.

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140, such test organization budget, from a user via the user interface.

In some embodiments, the regression testing module 130 is configured to provide regression testing using AI. The regression testing module 130 may further include a pseudo sample module 131 (e.g., for providing pseudo samples) and a state estimation module 132 (e.g., for providing an estimated state for a test artifact that was not tested in the last release). In one embodiment, the regression testing module 130 and its submodules 131 and 132 may be implemented by hardware, software and/or a combination thereof.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
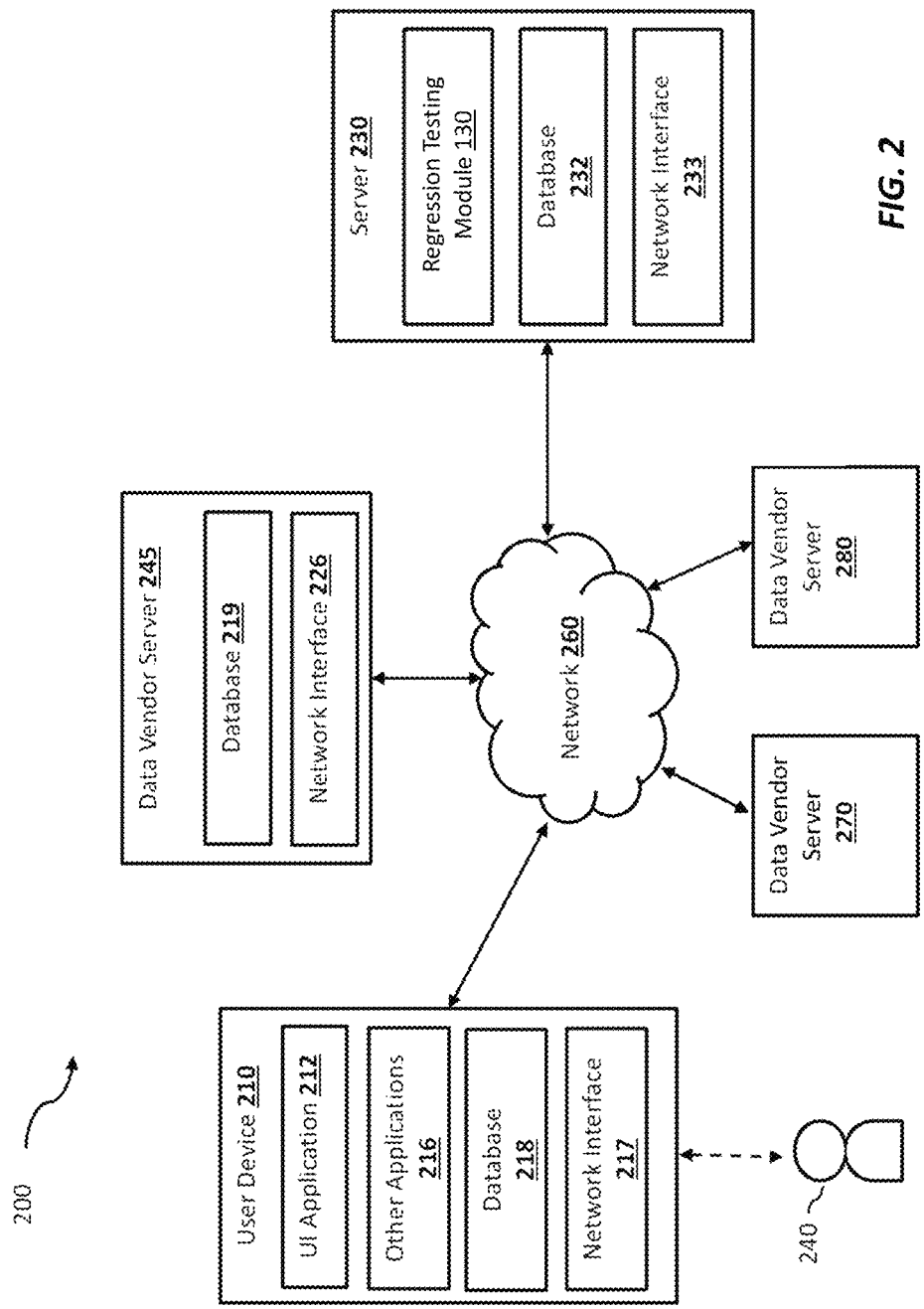
FIG. 2 is a simplified block diagram of a networked system suitable for implementing the regression testing framework described in FIGS. 3-21 and other embodiments described herein.

FIG. 2 is a simplified block diagram of a networked system suitable for implementing the regression testing framework described in FIGS. 3-21 and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating candidate organizations to perform regression testing from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a recommendation message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the organization list for regression testing.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 226 adapted to communicate with data vendor server 245 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases to provide training datasets including regression testing results from previous releases to the server 230. The database may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 219, via the network interface 226, to the server 230.

The server 230 may be housed with the regression testing module 130 and its submodules described in FIG. 1. In some implementations, regression testing module 130 may receive data from database 219 at the data vendor server 245 via the network 260 to generate selected organizations for regression testing for the current release. The selected organizations for regression testing for the current release may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the regression testing model 130.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
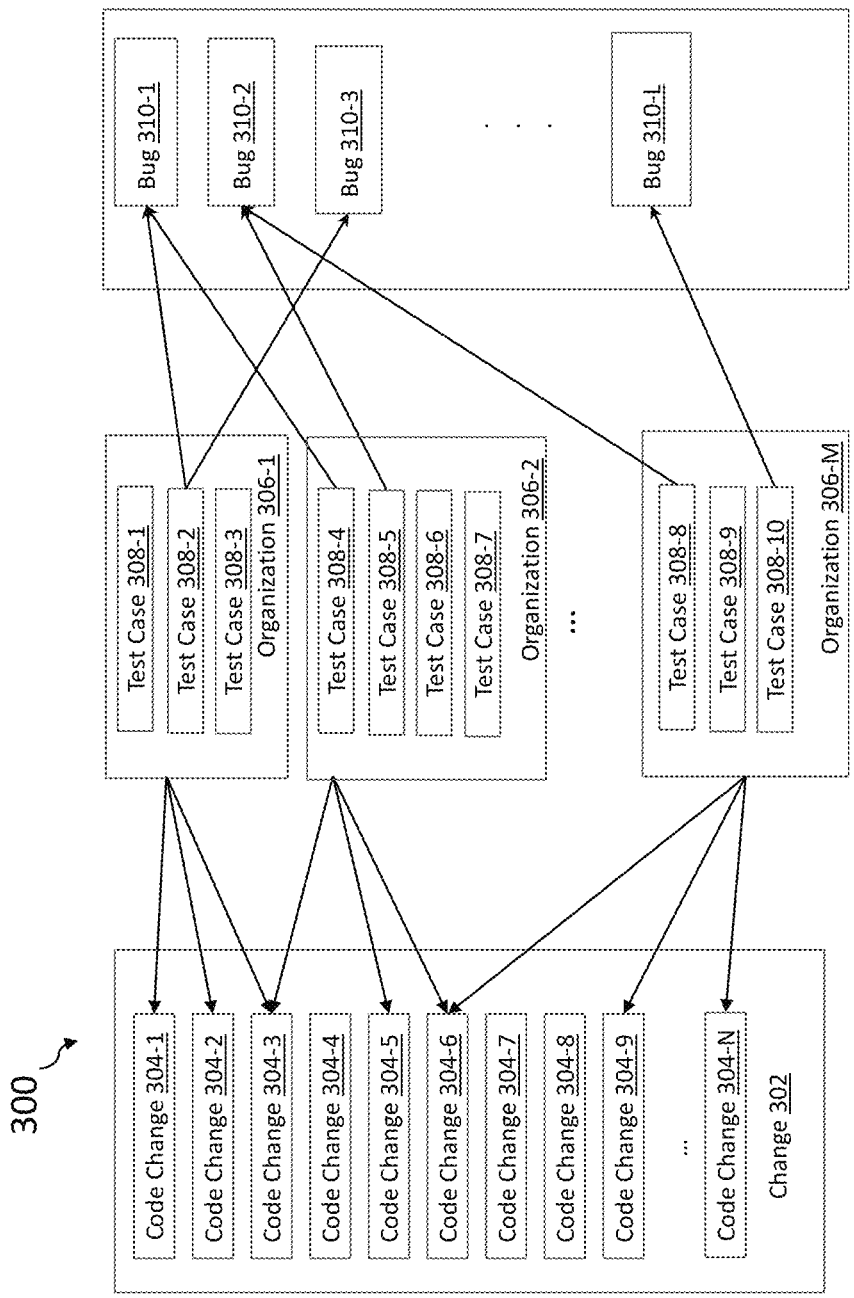
FIG. 3 is an example regression testing framework 300 for performing AI based regression testing according to some embodiments described herein.

Referring to FIG. 3, illustrated therein is an example regression testing framework 300. As shown in FIG. 3, the regression testing framework 300 for a particular includes code 302 including code changes 304-1 through 304-N, where N is the total number of code changes. Some of the code changes (e.g., code changes 304-1, 304-2, 304-3, 304-5, 304-6, 304-9, 304-N) cause regression, while other code changes (e.g., code changes 304-4, 304-7, and 304-8) don't cause regression.

In various embodiments, code 302 may be used by one or more organizations (also referred to as orgs) 306-1 through 306-M, where M is the total number of organizations. Each organization may have one or more test cases. For example, organization 306-1 may have test cases 308-1 through 308-3, organization 306-2 may have test cases 308-4 through 308-7, and organization 306-M may have test cases 308-10. Different organizations may have test cases that have different code dependencies on the code changes 304-1 through 304-N. In the example of FIG. 3, for organization 306-1, test cases 308-1 through 308-3 have code dependencies on code changes 304-1, 304-2, and 304-3. For organization 306-2, test cases 308-4 through 308-7 have code dependencies on code changes 304-3, 304-5, and 304-6. For organization 306-M, test cases 308-8 through 308-10 have code dependencies on code changes 304-6, 304-9, and 304-N.

For regression testing of a release, a test case may pass or fail. The passed test case is associated with no bugs, while a failed test case may be associated with a single bug or multiple bugs. Different test cases may have the same bugs, different bugs, or overlapping bugs. In the example of FIG. 3, for the regression testing of the release, test cases 308-1, 308-3, 308-6, 308-7, and 308-9 pass, and test cases 308-2, 308-4, 308-5, 308-8, and 308-10 fail. Specifically, test case 308-2 is associated with bugs 310-1 and 301-3. Test case 308-4 is associated with bug 310-1. Test case 308-5 is associated with bug 310-2. Test case 308-8 is associated with bug 310-2. Test case 308-10 is associated with bug 310-L.

As discussed in detail below, by using artificial intelligence for regression testing, high coverage of bugs may be achieved while reducing the number of organizations tested at each release. In other words, by using artificial intelligence for regression testing, high coverage of regression testing may be achieved consistently with high certainty may be achieved without testing all organizations and/or all test cases thereof.

Figure 4:
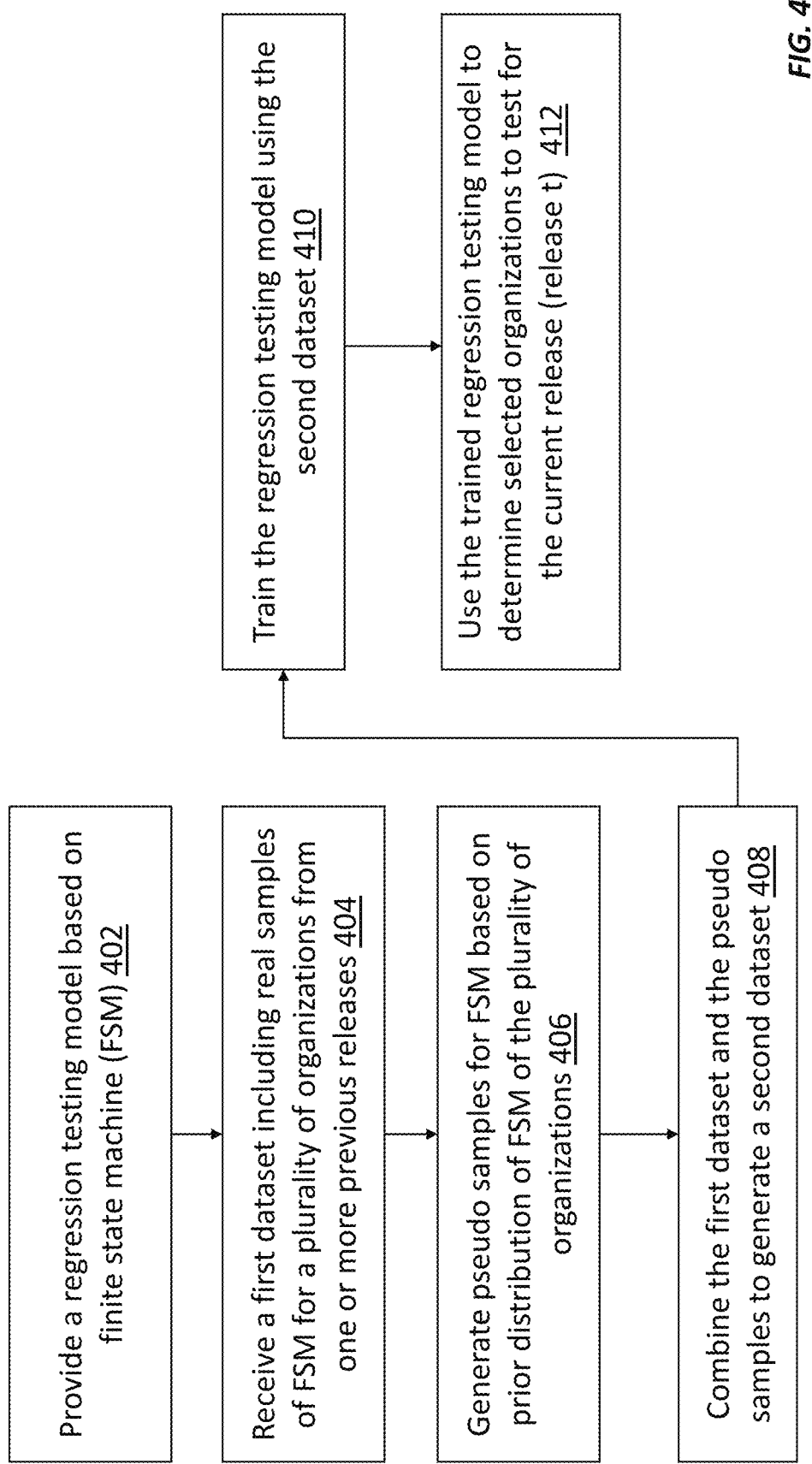
FIG. 4 is an example logic flow diagram illustrating a method of providing AI based regression testing based on the regression testing framework, according to some embodiments described herein.

FIG. 4 is an example logic flow diagram illustrating a method of regression testing using artificial intelligence based regression testing framework shown in FIGS. 1-2, according to some embodiments described herein. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the regression testing module 130 (e.g., FIGS. 1-2) that performs regression testing.

At step 402, a regression testing model for a plurality of organizations is provided based on Finite State Machine (FSM), e.g., using a network model using Markov process. FSM is a behavioral model of a system providing a finite number of states. FSM may change from one state to another in response to some inputs, and such change from one state to another is called a state transition or transition. Note that as described below, transition also includes cases where the states before and after a release remain the same.

Figure 5:
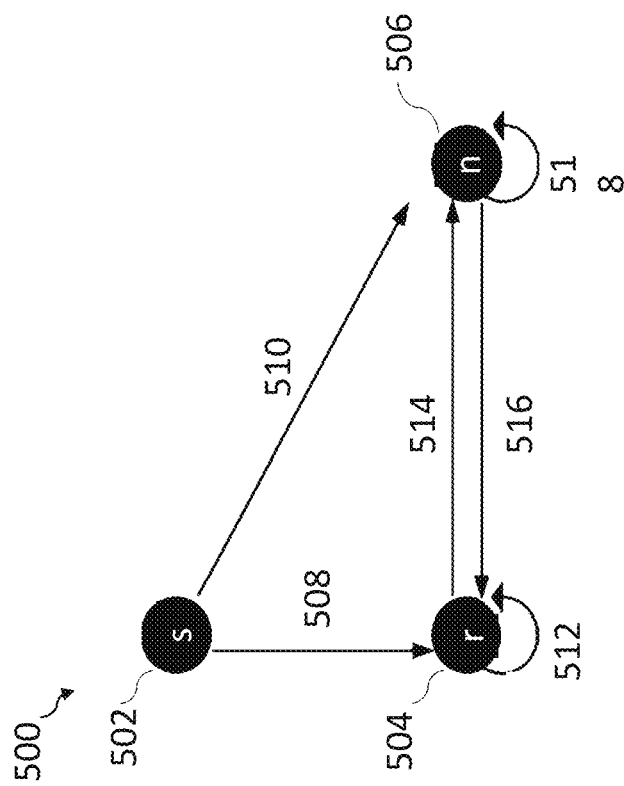
FIG. 5 is an example diagram of a finite state machine (FSM) model for an organization, according to some embodiments described herein.

Referring to FIG. 5, an example organization level FSM 500 is illustrated. Each of the plurality of organizations may be in multiple states, including for example, a New Org State 502 (denoted as S=s), Org with at least one regression state 504 (denoted as S=r), and Org has no regressions state 506 (denoted as S=n). FSM 500 also includes a plurality of transitions from one state to another, including transition 508 (changing from state 502 to state 504), transition 510 (changing from state 502 to state 506), transition 512 (remaining at state 504), transition 514 (changing from state 504 to state 506), transition 516 (changing from state 506 to state 504), and transition 518 (remaining at state 506).

In various embodiments, the FSM for the organizations may be represented as follows: $S_t$ and $S_{t-1}$ represent states at timesteps (aka releases) t (e.g., current release t) and t−1 (e.g., previous release t−1) respectively. $P(S_t|S_{t-1})$ represents the (prior) probability of state transition independent of the organization. $P(S_t|S_{t-1}, o)$ represents the (posterior) probability of state transition for org o.

In some embodiments, transitions in an organization are modeled using FSM for test artifacts (e.g., with corresponding test cases) at finer levels than the organization level, which may provide more data. The test artifacts, denoted as m, may include test artifacts at various levels including, for example, organization, package (e.g., an organization may include a plurality of packages), class (e.g., a package may include a plurality of classes), test method (e.g., a class may include a plurality of test methods), any other suitable artifacts for regression testing, and/or a combination thereof. Specifically, $P(S_t|S_{t-1}, m^o_i)$ may be used to denote the state transition probability of $i^{th}$ test artifact of organization o. Then the posterior probability of the org o to have at least one test artifact to fail at the $t^{th}$ release is provided as follows:

$$P(S_t = r|S_{t-1}, o) = 1 - \prod_i^{|m^o|} P(S_t = n|S_{t-1}, m^o_i), \quad (1)$$

where $P(S_t=n|S_{t-1}, m^o_i)$ denotes the probability of a test artifact not to fail, $$\prod_i^{|m^o|} P(S_t = n|S_{t-1}, m^o_i)$$

denotes the probability of all test artifacts not to fail.

At step 404, a first dataset of samples of states of a plurality of organizations from regression testing in previous releases is received. These samples may include real observed samples from regression testing of the plurality of organizations from one or more previous releases. In some embodiments, because of insufficient data, the posterior probability may be noisy or incomplete.

At step 406, pseudo samples are generated to address the challenges of insufficient data, e.g., by drawing pseudo-count $n_{eq}$ from prior distribution $P(S_t|S_{t-1})$. For example, pseudo samples may be generated by sampling prior distribution based on FSM of all the organizations combined.

Figure 7:
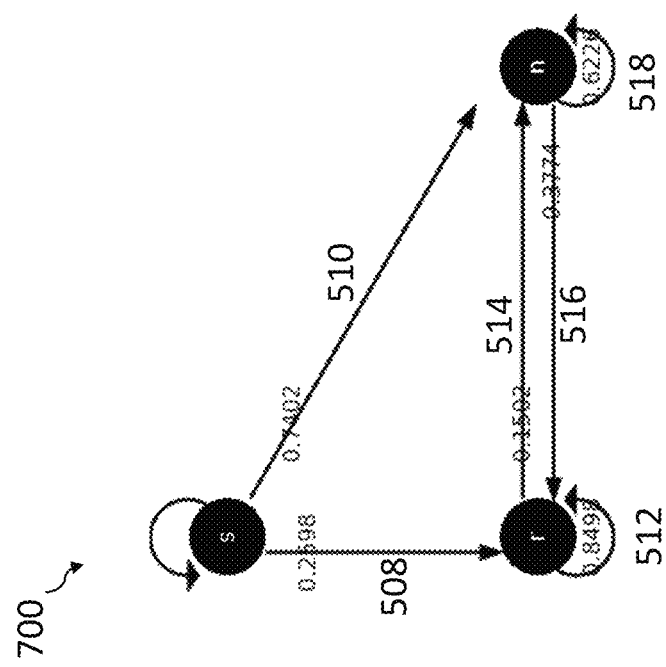
FIG. 7 is another example diagram of a FSM model for an organization, according to some embodiments described herein.
Figure 6:
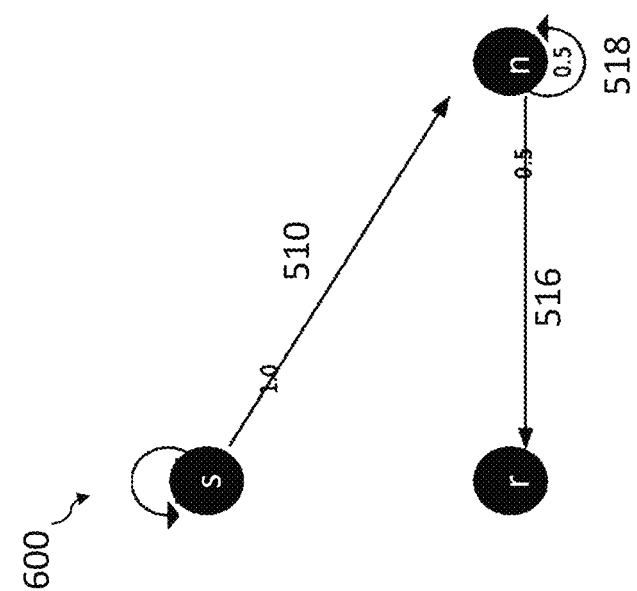
FIG. 6 is another example diagram of a FSM model for an organization, according to some embodiments described herein.

At step 408, the pseudo samples are combined with the first dataset to generate a second dataset. By using the pseudo samples, Bayesian Laplace smoothing is performed by adding pseudo-count $n_{eq}$ from prior distribution $P(S_t|S_{t-1})$ to smoothen posterior distribution. Referring to FIGS. 6, 7, and 8, the smoothing process is illustrated. Referring to the example of FIG. 6, an organization level FSM 600 without pseudo counts is illustrated, which has data for state transitions 510, 516, and 518, but does not have data for other state transitions (e.g., state transitions 508, 512, 514). Referring to the example of FIG. 7, an organization level FSM 700 with pseudo counts is illustrated, which provides data for all transition states 508 through 518. Referring to the example of FIG. 8, a smoothing process 800 is performed by combining real samples 802 (e.g., observed data) from the first dataset and the pseudo samples 804 generated at step 406. In some embodiments, a larger pseudo-count $n_{eq}$ may require higher evidence needed to move the posterior away from the prior.

At step 410, the regression testing model is trained using the second dataset. In various embodiments, parameters of the regression testing model are updated by learning from the samples of the second dataset. At step 412, the trained regression testing model is used to provide a portion of all organizations as selected organizations for performing regression testing for the current release (e.g., release t).

In some embodiments, at step 412, the trained regression testing model ranks all the candidate organizations (e.g., 100 organizations) based on the probability of each organization having at least one bug at the current release. In some examples, a desired coverage (e.g., 80% & 90%) of the bugs (e.g., bugs of one or more particular types, bugs of all types, etc.) is provided, and the trained regression testing model determines the number of organizations to test (e.g., 30 out of 100 total organizations) for achieving such coverage. The trained regression testing model then provides the top ranked organizations (e.g., 30 organizations having the highest probability) as selected organizations to test for the current release (release t). In some other examples, an organization test budget (e.g., 50% of all organizations for test) is provided. In those examples, the trained regression testing model then provides the top ranked organizations with the budget (e.g., 50% of 100 total organizations) as selected organizations to test for the current release (release t).

Referring to FIG. 9, illustrated therein is an example table illustrating the artifact scale, where one organization may have approximately 30 test classes, and 60 test methods. Each artifact may have its own identifier (e.g., organization id, class id, test method id). Referring to FIG. 10, illustrated therein is an example FSM of all class level artifacts for an organization. Referring to FIG. 11, illustrated is a table listing experimental data for determining the number of organizations to test for the desired coverages under variable configurations. For example, for coverage of bugs of a first type 1102, the least number of organizations to test for the desired coverage of 80% is 14, where the corresponding model includes organization level artifacts and a zero pseudo count. For coverage of bugs of a first type 1102, the least number of organizations to test for the desired coverage of 90% is 27, where the corresponding model includes organization level and class level artifacts and a pseudo count of 10. For coverage of bugs of a second type 1104, the least number of organizations to test for the desired coverage of 80% is 30, where the corresponding model includes organization level and class level artifacts and a pseudo count of 10. For coverage of bugs of a second type 1104, the least number of organizations to test for the desired coverage of 90% is 50, where the corresponding includes organization level and class level artifacts and a pseudo count of 0. For all coverage of bugs 1106, the least number of organizations to test for the desired coverage of 80% is 25, where the corresponding model includes organization level and class level artifacts and a pseudo count of 10. For all coverage of bugs 1106, the least number of organizations to test for the desired coverage of 90% is 44, where the corresponding includes organization level and class level artifacts and a pseudo count of 10.

Figure 12:
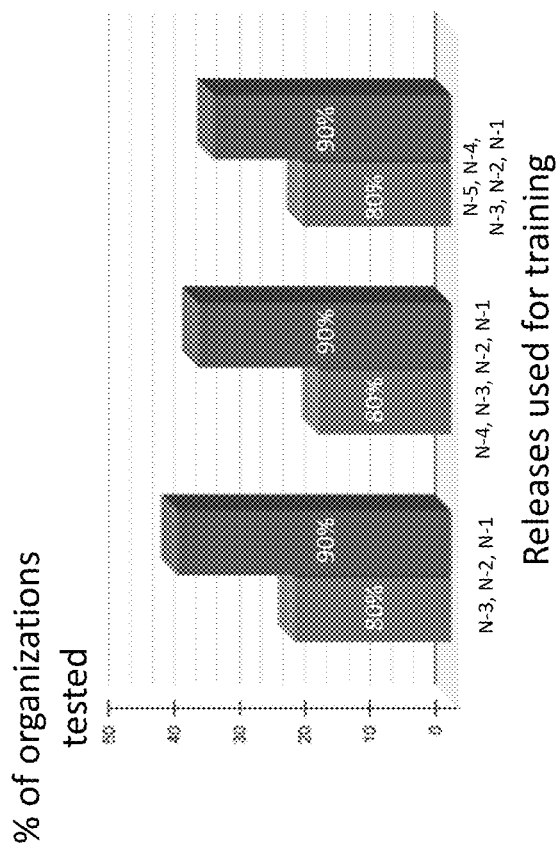
Figure 13:
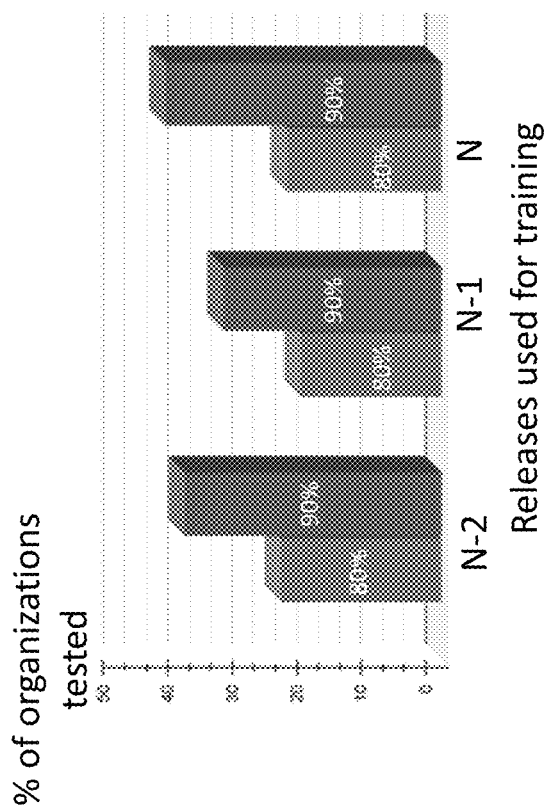
Figure 14:
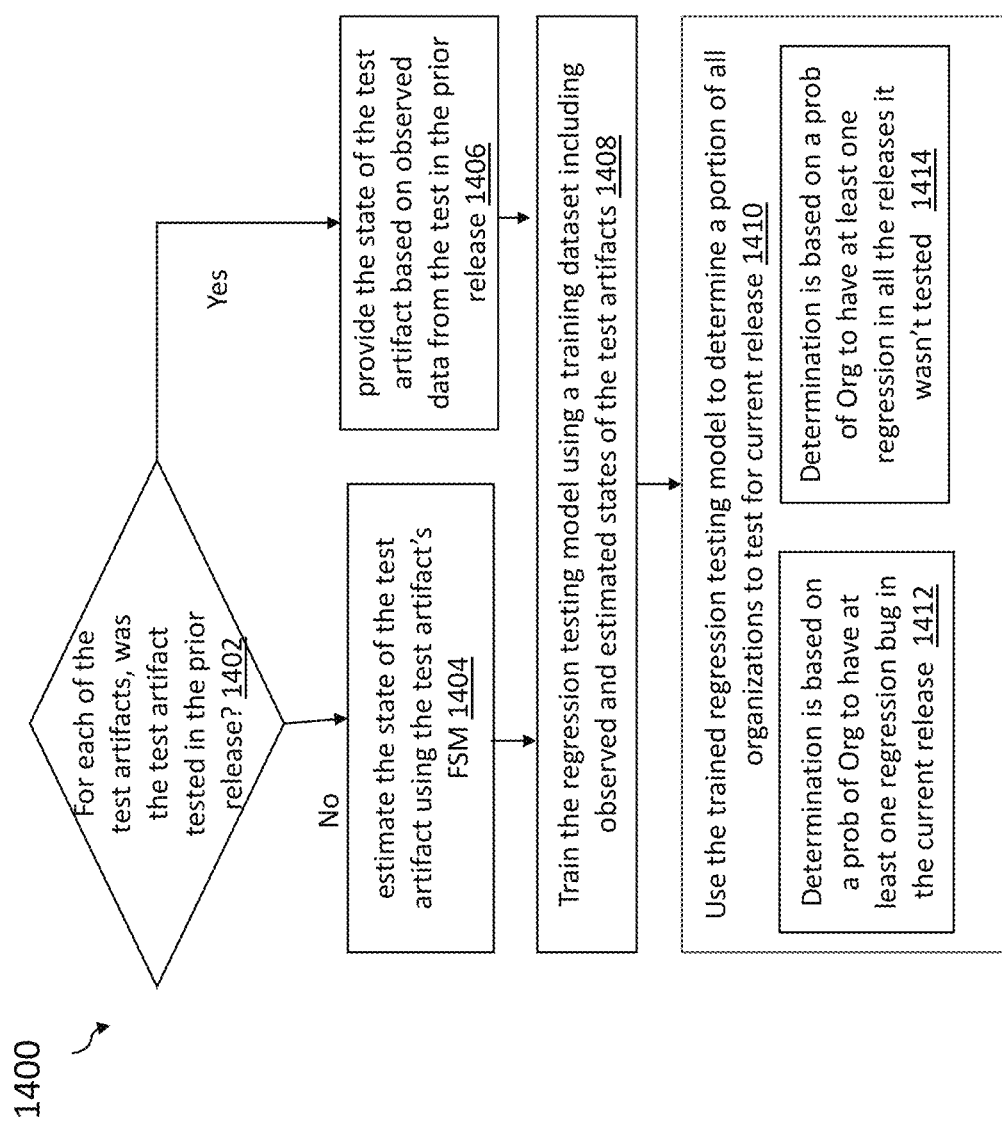
FIG. 14 is an example logic flow diagram illustrating a method of providing AI based regression testing based on the regression testing framework with long term modeling, according to some embodiments described herein.

Referring to FIGS. 12 and 13, performance of the AI based regression testing framework is illustrated. FIG. 12 illustrates the consistency of the model performance with releases N, N+1, and N+2 for achieving 80% and 90% coverage of all bugs. In the example of FIG. 12, the AI based regression testing framework is trained with data from three prior releases. As shown in FIG. 12, for each of releases N, N+1, and N+2, 80% coverage is achieved with 27.5 (std: 4.1)% of organizations, while 90% coverage is achieved with 41.5(std:6.7)% organizations.

FIG. 13 illustrates the performance of the AI based regression testing framework trained on increasing number of prior releases, where coverage is improved with more prior release data. Specifically, the number of organizations tested for release N for achieving 80% and 90% coverage of all bugs is illustrated, where the AI based regression testing framework is trained with 3 (prior releases N−3, N−2, and N−1), 4 (prior releases N−4, N−3, N−2, and N−1), and 5 (prior releases N−5, N−4, N−3, N−2, and N−1) prior releases.

Referring to FIGS. 14-20, the AI based regression testing framework with long term modeling for is described. In some embodiments, it is assumed that all the tests were executed (e.g., at release t−1) leading up to the release being analyzed (e.g. current release t). However, in various embodiments, not all tests of all organizations were tested (e.g., at release t−1) leading up to the current release. In examples where a test artifact was not tested leading up to the current release, its state $S_{t-1}$ is not known and as such cannot be part of the training. Referring to the example of FIG. 14, method 1400 for regression testing with long term modeling is provided to address this issue. It is noted that in various embodiments, method 1400 is substantially similar to method 400 other than the steps described below. One or more of the processes of method 1400 may be implemented, at least in part, in the form of executable code stored on non-transitory, tangible, machine-readable media that when run by one or more processors may cause the one or more processors to perform one or more of the processes. In some embodiments, method 1400 corresponds to the operation of the regression testing module 130 (e.g., FIGS. 1-2) that performs regression testing.

At step 1402, for each of the test artifacts, it is determined whether the test artifact was tested in the prior release (release t−1) of current release (release t). The test artifact may be an organization level test artifact, or one of the finer level test artifact (e.g., package, class, test method, etc.)

Figures 15, 16:
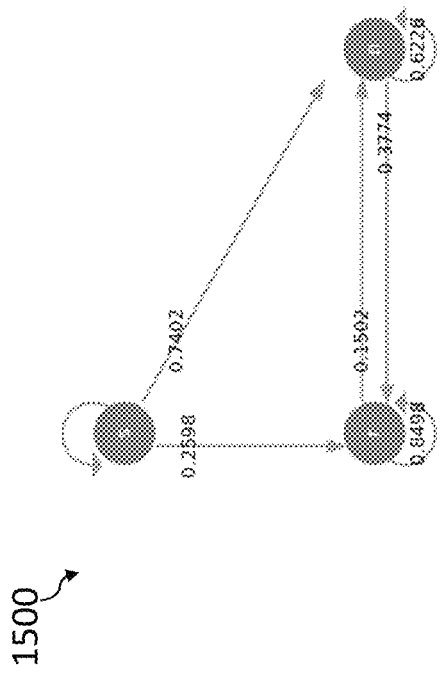
FIGS. 15-20 provide example data performance of the AI based regression testing model with long term modeling, according to some embodiments described herein.

In embodiments where it is determined that the test artifact was not in the prior release (release t−1) of the current release (release t), at step 1404, the state of the test artifact is estimated using the test artifact's FSM. Referring to FIGS. 15 and 16, examples of estimating of the state of the test artifact are illustrated. The example of FIG. 15 illustrates an FSM 1500 of a test artifact with values/probabilities for the state transition. The example of FIG. 16 illustrates estimated states of the test artifact based on FSM 1500. Example estimated state 1602 illustrates that the estimated state of the test artifact is s=1.0, r=0.0, and n=0.0 where the number of releases since observation is 0. Example estimated state 1604 illustrates that the estimated state of the test artifact is s=0.0, r=0.26, and n=0.74 where the number of releases since observation is 1. Example estimated state 1606 illustrates that the estimated state of the test artifact is s=0.0, r=0.50, and n=0.50 where the number of releases since observation is 2. Example estimated state 1608 illustrates that the estimated state of the test artifact is s=0.0, r=0.72, and n=0.38 where the number of releases since observation is 3. Specifically, the modeling for the estimated state of the test artifact may be provided as follows. The state of the test artifact that has missed testing for release t−1 may estimated as:

$$P(S_t) = \prod_{t'=1}^{t-1} P(S_{t'}|S_{t-1})S_0.$$

In embodiments where it is determined that the test artifact was tested in the prior release (release t−1) of the current release (release t), at step 1406, the true state of the test artifact is known with absolute certainty, where the test artifact is in one of the three states (s, r, n) as provided by the observed data from the regression test performed for the prior release (release t−1). Specifically, the modeling for the state of the test artifact based on the observed data in release t−1 is the same as previously provided, e.g., using $P(S_t|S_{t-1},m^o_i)$ is used to denote the state transition probability of $i^{th}$ artifact of organization o.

At step 1408, the regression testing framework is trained using a training dataset that includes both observed data and estimated data for states of test artifacts in previous releases. In some embodiments, pseudo samples may be added to the training dataset, as described at steps 406 and 408 of method 400.

At step 1410, the trained regression testing framework is used to determine a portion of organizations to perform regression testing for the current release (release t). In an example, organizations are ranked based on the probabilities of having at least one bug, and the top 50% (or any other suitable budget) of the organizations are determined to be the ones to be tested for the current release (release t).

In some embodiments, at step 1412, the probability used to rank the organizations is based on the probability of the organization having at least one regression bug in the current release (release t). In an example, organizations are ranked based on the probabilities, and the top 50% (or any other suitable budget) of the organizations are determined to be the ones to be tested for the current release (release t). Specifically, for organization o where test artifacts were not tested in one or more prior releases (e.g., release t−1, release t−2 and release-1, etc.), states of the test artifacts are estimated based on the corresponding FSM. Posterior probability of the organization o to have at least one regression at release t may be provided as:

$$P(S_t = r | S_{t-1}, o) = \\ 1 - \sum_{s \in (r, n, s_0)} \prod_i^{|m^o|} P(S_t = n | S_{t-1} = s, m_i^o) \prod_{t'=1}^{t-1} P(S_{t'} | S_{t'-1}) S_0, \quad (2)$$

Figure 17:
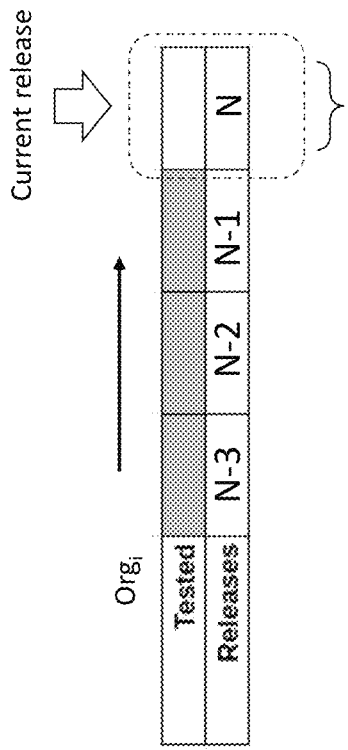

For organization o where test artifacts were tested in the prior release (release t−1), the observed states from the previous test are used for $S_{t-1}$. The posterior probability of the organization o to have at least one regression at release t is the same as provided at (1). Referring to FIG. 17, illustrated therein is an example process of step 1412, where an organization ($Org_i$) was tested in all previous releases (e.g., previous releases N−3, N−2, and N−1). A probability of the organization having at least one regression bug in the current release is determined. The portion of organizations for regression test for the current release is determined based on probabilities of all organizations having at least one regression bug in the current release, e.g., by selecting the highest top 50% of all organizations ranked based on the corresponding probabilities.

In some embodiments, at step 1412, the portion of organizations to perform regression testing for the current release is determined based on probabilities of the organizations having at least one regression bug in the current release (release t).

In some embodiments, at step 1414, the probability used to rank the organizations is based on the probability of the organization having at least one regression in all the releases it wasn't tested. Specifically, the posterior is modeled as Bernoulli random variable, such that more information may be gained. By using the Bernoulli random variable, there is a better chance of catching missed bugs during regression testing, by computing the probability of having o bug in any of the releases since the organization was last tested. Specifically, the posterior probability of an organization having at least one bug in any of the releases since the organization was last tested may be provided as follows:

$$P(S_{\le t} = r | S_t, o) = 1 - \prod_{t'=1}^{t-1} P(S_{t'} = n | S_{t-1}, o). \quad (3)$$

Figure 18:
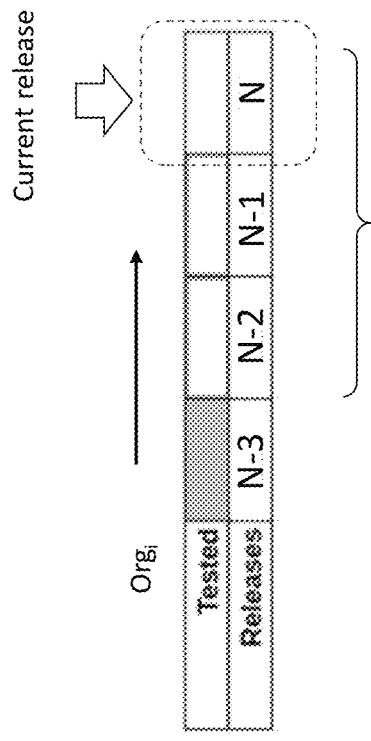
Figures 19, 20:
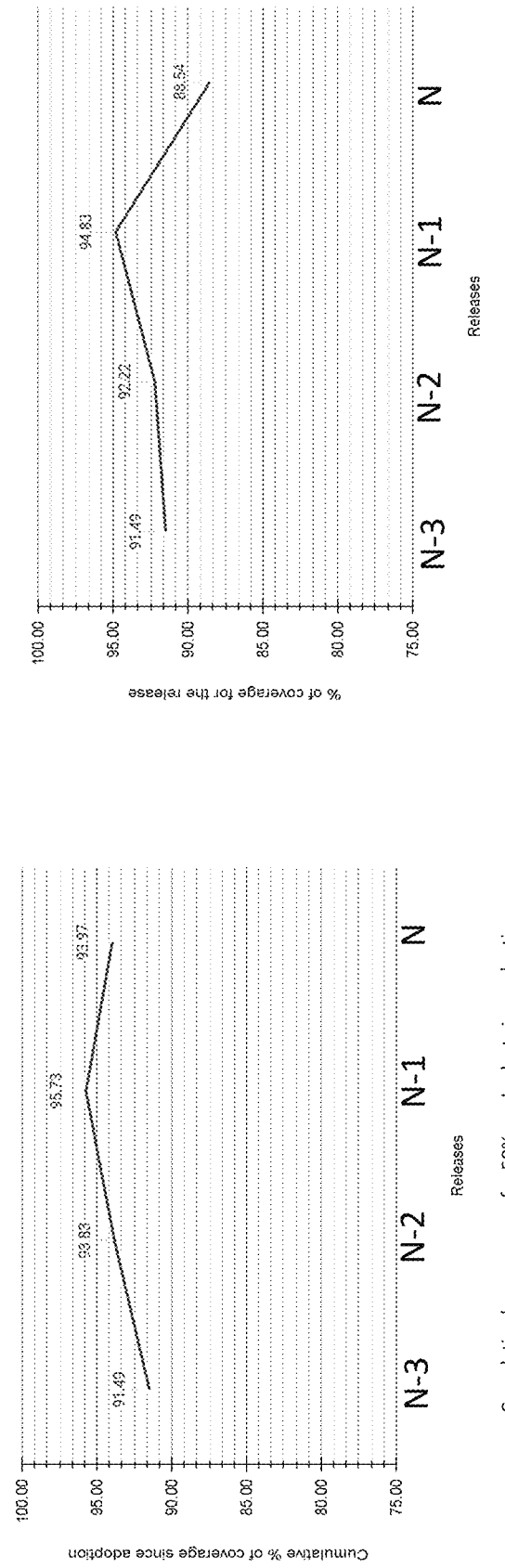

Referring to FIGS. 17 and 18, illustrated therein are comparison of example probabilities used to rank the organizations, wherein FIG. 17 illustrates ranking using probability of the organization having at least one regression in the current release, FIG. 18 illustrates process of step 1414, where ranking uses probability of the organization having at least one regression in the all the releases that it was not tested. As shown in FIG. 18, an organization ($Org_i$) was tested in previous release N−3, but was not tested in previous releases N−2 and N−1. A probability of the organizations having at least one regression bug in all the releases that it was not tested (releases N−2, N−1, and N) is determined. The portion of organizations for regression testing for the current release (release N) is determined based on those probabilities. Referring to FIG. 19, in an example, the percentage of organizations to be tested (also referred to as budget) is provided (e.g., 50%), and the cumulative coverage is evaluated. Candidate orgs for testing are arranged by their probability to have at least one regression since they are last tested. In an example, the regression testing model was trained using all organization test result for N−5 through N−3. From release N−2, the regression testing model is trained only on organizations that were executed in each release. The ground truth for coverage uses the results of testing all organizations. As shown in the example of FIG. 19, for a budget of 50%, the cumulative coverage is 93.9 (std:1.74)%, and cumulative coverage is consistent across multiple releases, which is better than the per release instantaneous coverage for 50% organization budget as shown in the example of FIG. 20.

Figure 21:
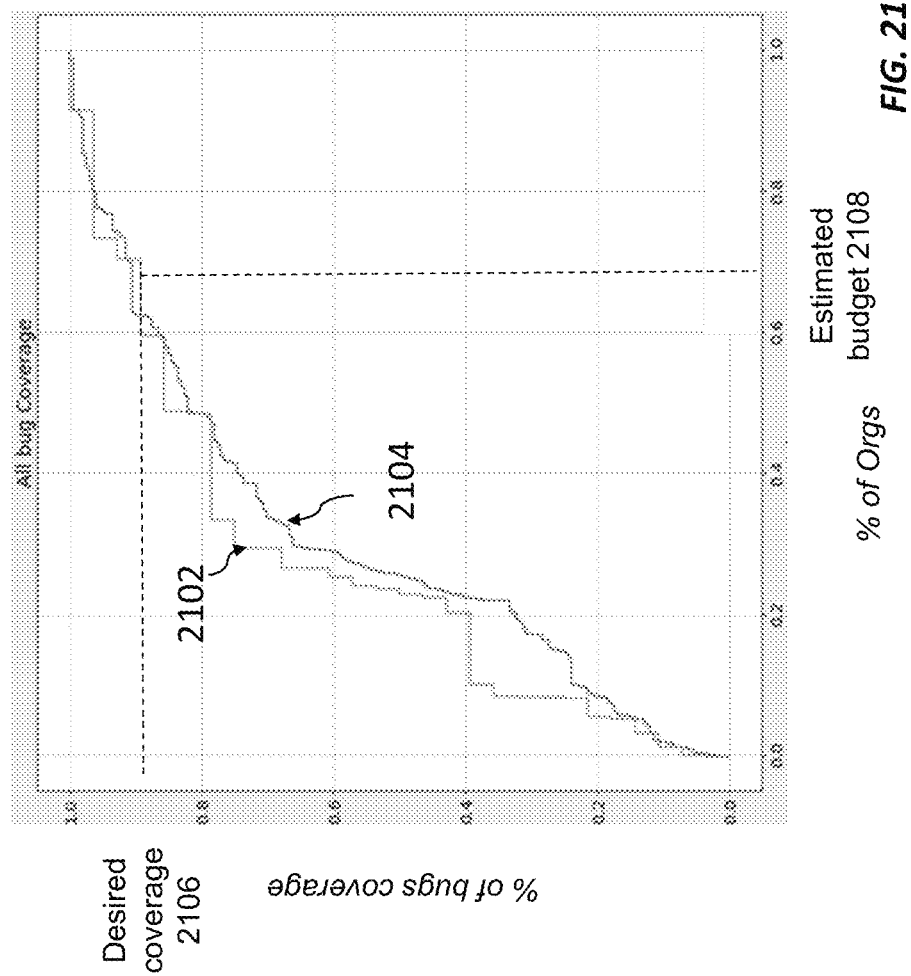
FIG. 21 illustrates an example method for estimating an adaptive budget of organizations to test for the regression testing framework, according to some embodiments described herein.

Referring to FIG. 21, in various embodiments, an estimated organization test budget, adaptive to the current release, instead of a fixed organization test budget for all releases (e.g., 50% of all organizations for test), is used. As shown in FIG. 21, the budget estimate 2108 (e.g., 68% of all organizations for test) is determined based on the desired bug coverage 2106 (e.g., 95%) and a sample (e.g., 20%) of all organizations. Specifically, regression tests for the current test are run on a sample (e.g., 20% of all organizations for test) of all organizations, and curve 2104 illustrates the results including the bug coverage vs. coverage of the sample organizations. The results of the sample organizations. The likelihood of bug coverage for all organizations, shown by curve 2102, is computed based on the results from the sample organizations. The optimal budget cut off 2108 (e.g., 68% of all organizations for test) is determined based on the likelihood of bug coverage for all organizations as illustrated by curve 2102. By using an estimated adaptive organization test budget, efficiency of the regression testing framework for achieving the desired bug coverage is improved.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features.

One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for regression testing, the method comprising:
   providing a regression testing network model for a first plurality of organizations using a common codebase, wherein the regression testing network model provides an organization finite state machine (FSM) model for each organization, wherein the FSM model includes:
   a state transition probability associated with a plurality of test artifacts of the first plurality of organizations; and
   a posterior probability to have at least one test artifact to fail at a $T^{th}$ release using the state transition probability, wherein T is an integer number greater than 0;
   receiving, via a data interface, a first dataset including samples of the organization FSM models based on regression testing for one or more previous releases of the common codebase prior to the $T^{th}$ release of the common codebase;
   generating a training dataset based on the first dataset;
   training the regression testing network model using the training dataset;
   receiving a desired bug coverage percentage;
   providing a plurality of sample organizations from the first plurality of organizations;
   determining, using the trained regression testing network model, an organization test budget indicating a maximum number of organizations to test for the $T^{th}$ release based on the desired bug coverage percentage and the plurality of sample organizations;
   determining, based on the organization test budget, from the first plurality of organizations using the trained regression testing network model, a selected subset of organizations for regression testing for the $T^{th}$ release; and
   performing, only on the selected subset of organizations, regression testing for the $T^{th}$ release.

2. The method of claim 1, wherein each organization FSM includes a new state, an at-lease-one regression state, and a no-regression state.

3. The method of claim 1, wherein the generating the training dataset further includes:
   generating one or more pseudo samples by sampling a prior distribution of an FSM model corresponding to a combination of the first plurality of organizations; and
   generating the training set based on the one or more pseudo samples and the first dataset.

4. The method of claim 1, wherein a first organization of the first plurality of organizations includes one or more test artifacts, and
   wherein the regression testing network model provides a test artifact FSM model for each test artifact.

5. The method of claim 1, further comprising:
   determining that a first test artifact of a first organization was not tested in a second release prior to the $T^{th}$ release;
   generating an estimated state of the first test artifact based on its FSM model; and
   generating the training dataset based on the estimated state of the first test artifact and the first dataset.

6. The method of claim 1, wherein the determining the selected subset of organizations for regression testing for the $T^{th}$ release includes:
   determining, for a first organization of the first plurality of organizations, a first probability associated with having at least one regression in the $T^{th}$ release; and
   determining the selected subset of organizations for regression testing for the $T^{th}$ release based on the first probability.

7. The method of claim 6, further comprising:
   determining that the first organization of the first plurality of organizations was not tested in one or more prior releases;
   wherein the first probability is associated with having at least one regression in the one or more prior releases and the $T^{th}$ release.

8. A non-transitory machine-readable medium comprising a plurality of machine-readable instructions which, when executed by one or more processors, are adapted to cause the one or more processors to perform a method comprising:
   providing a regression testing network model for a first plurality of organizations using a common codebase, wherein the regression testing network model provides an organization finite state machine (FSM) model for each organization, wherein the FSM model includes:
   a state transition probability associated with a plurality of test artifacts of the first plurality of organizations; and
   a posterior probability to have at least one test artifact to fail at a $T^{th}$ release using the state transition probability, wherein T is an integer number greater than 0;
   receiving, via a data interface, a first dataset including samples of the organization FSM models based on regression testing for one or more previous releases of the common codebase prior to the $T^{th}$ release of the common codebase;
   generating a training dataset based on the first dataset;
   training the regression testing network model using the training dataset;
   receiving a desired bug coverage percentage;
   providing a plurality of sample organizations from the first plurality of organizations;
   determining, using the trained regression testing network model, an organization test budget indicating a maximum number of organizations to test for the $T^{th}$ release based on the desired bug coverage percentage and the plurality of sample organizations;
   determining, based on the organization test budget, from the first plurality of organizations using the trained regression testing network model, a selected subset of organizations for regression testing for the $T^{th}$ release; and
   performing, only on the selected subset of organizations, regression testing for the $T^{th}$ release.

9. The non-transitory machine-readable medium of claim 8, wherein each organization FSM includes a new state, an at-lease-one regression state, and a no-regression state.

10. The non-transitory machine-readable medium of claim 8, wherein the generating the training dataset further includes:
    generating one or more pseudo samples by sampling a prior distribution of an FSM model corresponding to a combination of the first plurality of organizations; and
    generating the training set based on the one or more pseudo samples and the first dataset.

11. The non-transitory machine-readable medium of claim 8, wherein a first organization of the first plurality of organizations includes one or more test artifacts, and wherein the regression testing network model provides a test artifact FSM model for each test artifact.

12. The non-transitory machine-readable medium of claim 8, further comprising:
    determining that a first test artifact of a first organization was not tested in a second release prior to the $T^{th}$ release;
    generating an estimated state of the first test artifact based on its FSM model; and
    generating the training dataset based on the estimated state of the first test artifact and the first dataset.

13. The non-transitory machine-readable medium of claim 8, wherein the determining the selected subset of organizations for regression testing for the $T^{th}$ release includes:
    determining, for a first organization of the first plurality of organizations, a first probability associated with having at least one regression in the $T^{th}$ release; and
    determining the selected subset of organizations for regression testing for the $T^{th}$ release based on the first probability.

14. The non-transitory machine-readable medium of claim 13, wherein the method includes:
    determining that the first organization of the first plurality of organizations was not tested in one or more prior releases;
    wherein the first probability is associated with having at least one regression in the one or more prior releases and the $T^{th}$ release.

15. A system, comprising: a non-transitory memory; and one or more hardware processors coupled to the non-transitory memory and configured to read instructions from the non-transitory memory to cause the system to perform a method comprising:
    providing a regression testing network model for a first plurality of organizations using a common codebase, wherein the regression testing network model provides an organization finite state machine (FSM) model for each organization, wherein the FSM model includes:
    a state transition probability associated with a plurality of test artifacts of the first plurality of organizations; and
    a posterior probability to have at least one test artifact to fail at a $T^{th}$ release using the state transition probability, wherein T is an integer number greater than 0;
    receiving, via a data interface, a first dataset including samples of the organization FSM models based on regression testing for one or more previous releases of the common codebase prior to the $T^{th}$ release of the common codebase;
    generating a training dataset based on the first dataset;
    training the regression testing network model using the training dataset;
    receiving a desired bug coverage percentage;
    providing a plurality of sample organizations from the first plurality of organizations;
    determining, using the trained regression testing network model, an organization test budget indicating a maximum number of organizations to test for the $T^{th}$ release based on the desired bug coverage percentage and the plurality of sample organizations;
    determining, based on the organization test budget, determining, from the first plurality of organizations using the trained regression testing network model, a selected subset of organizations for regression testing for the $T^{th}$ release; and
    performing, only on the selected subset of organizations, regression testing for the $T^{th}$ release.

16. The system of claim 15, wherein each organization FSM includes a new state, an at-lease-one regression state, and a no-regression state.

17. The system of claim 15, wherein the generating the training dataset further includes:
    generating one or more pseudo samples by sampling a prior distribution of an FSM model corresponding to a combination of the first plurality of organizations; and
    generating the training set based on the one or more pseudo samples and the first dataset.

18. The system of claim 15, wherein a first organization of the first plurality of organizations includes one or more test artifacts, and
    wherein the regression testing network model provides a test artifact FSM model for each test artifact.

19. The system of claim 15, further comprising:
    determining that a first test artifact of a first organization was not tested in a second release prior to the $T^{th}$ release;
    generating an estimated state of the first test artifact based on its FSM model; and
    generating the training dataset based on the estimated state of the first test artifact and the first dataset.

20. The system of claim 15, wherein the determining the selected subset of organizations for regression testing for the $T^{th}$ release includes:
    determining, for a first organization of the first plurality of organizations, a first probability associated with having at least one regression in the $T^{th}$ release; and
    determining the selected subset of organizations for regression testing for the $T^{th}$ release based on the first probability.

* * * * *